(12) United States Patent
Boura et al.

(10) Patent No.: US 6,947,418 B2
(45) Date of Patent: Sep. 20, 2005

(54) LOGICAL MULTICAST PACKET HANDLING

(75) Inventors: Jihad Boura, Northboro, MA (US);
Gary Dudley, N. Billerica, MA (US);
Kenneth DeLong, Hollis, NH (US);
Benny Siman-Tov, Framingham, MA (US)

(73) Assignee: 3Com Corporation, Marlborough, MA (US)

( * ) Notice: Subject to any disclaimer, the term of this patent is extended or adjusted under 35 U.S.C. 154(b) by 933 days.

(21) Appl. No.: 09/783,940

(22) Filed: Feb. 15, 2001

(65) Prior Publication Data

US 2002/0110139 A1 Aug. 15, 2002

(51) Int. Cl.$^7$ .......................... H04L 12/28; H04L 12/56
(52) U.S. Cl. .................... 370/390; 370/412; 370/417
(58) Field of Search ............................ 370/218, 229, 370/351, 396, 398, 395.2, 395.43, 395.5, 395.51, 395.52, 395.7, 395.71, 395.72, 400, 412, 413, 415, 417, 422, 428, 432, 389, 429, 390, 395.4, 395.41, 395.42, 468

(56) References Cited

U.S. PATENT DOCUMENTS

| | | | | |
|---|---|---|---|---|
| 5,583,861 A | * | 12/1996 | Holden | 370/395.42 |
| 5,909,438 A | | 6/1999 | Melden et al. | 370/388 |
| 6,768,744 B1 | * | 7/2004 | Kumaran et al. | 370/412 |

* cited by examiner

Primary Examiner—Ajit Patel
(74) Attorney, Agent, or Firm—Weingarten, Schurgin, Gagnebin & Lebovici LLP

(57) ABSTRACT

A switching system connectable to a communications network and configured to handle logical multicast data without degrading the flow of other data through the system. The switching system includes a plurality of input ports, a plurality of output ports, and a plurality of queues for buffering streams of data units being routed through the system. The switching system further includes at least one meter for metering data units to ensure that the data units conform to predetermined Quality of Service criteria. The logical multicast data is metered once at the meter and subsequently replicated and transmitted onto the communications network a predetermined number of times at an output port so as not to degrade the flow of other data through the system.

18 Claims, 3 Drawing Sheets

LOGICAL MULTICAST PACKET HANDLING

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention relates generally to communications technology, and more specifically to logical multicasting in a switching system.

Communications networks transfer digital data from source nodes to destination nodes on the network by routing data units such as data packets or frames through switching systems. A conventional switching system includes a plurality of input ports and a plurality of output ports, and is configured such that each output port may receive data units from any input port. The system determines the appropriate output port for a particular data unit by accessing information contained in a header field of the data unit.

The conventional switching system further includes a plurality of queues for buffering flows of data units being routed through the system. For example, the plurality of queues may be configured in a shared memory coupled between the input ports and the output ports, and control circuitry may direct a data flow stored in a respective queue to the appropriate output port. As mentioned above, each output port of the system may receive data units from any input port. The plurality of queues may therefore be employed to prevent data loss, e.g., when data units are simultaneously routed from more than one input port to a single output port. Moreover, amounts of data passing through the input and output ports at particular times may vary. The plurality of queues may therefore be configured to accommodate various amounts of bandwidth. For example, a conventional communications system architecture may provide a number of predetermined Quality of Service (QoS) levels such as a constant bit-rate service class and an unspecified bit-rate service class. The constant bit-rate service class typically supports real-time applications that require fixed amounts of bandwidth, and the unspecified bit-rate service class (also known as a "best effort" service) typically supports non-real-time applications that do not require fixed bandwidths. A first portion of the plurality of queues may therefore be configured as class queues to buffer data flows for constant bit-rate service, and a second portion of the queues may be configured as best effort queues to buffer data flows for best effort service. The conventional switching system may also include at least one meter such as a token bucket for metering data units provided to at least one of the class queues to ensure that the data units conform to the requirements of a particular constant bit-rate service. The switching system typically determines the appropriate service class for a particular data unit by accessing the header information of the data unit.

Not only may single data units be routed from at least one input port to at least one output port in the conventional switching system, but data units may also be replicated before being transmitted from the system. Data units that enter a switching system through a single input port and exit the system through a single output port without being replicated are generally known as unicast data, and data units that enter a switching system through a single input port and are replicated a number of times before exiting the system through at least one output port are generally known as multicast data. Specifically, single copies of a data unit that exit the system through more than one output port are known as spatial multicast data, and multiple copies of a data unit that exit the system through a single output port are known as logical multicast data.

One drawback of the conventional switching system is that routing logical multicast data through the system may adversely affect the flow of other data through the system. For example, logical multicast data requiring constant bit-rate service is typically metered by a token bucket, temporarily stored in a class queue of a shared memory, and then directed to a single output port of the system. However, because the routing of logical multicast data through the system typically involves the transfer of multiple copies of data units, an increased load at, e.g., the meter, the shared memory, and/or the connection between the shared memory and the output port resulting from the transfer of these multiple data unit copies may significantly degrade the flow of other data units through the system.

It would therefore be desirable to have a switching system that is capable of multicast operation. Such a switching system would be configured to handle logical multicast data without degrading the flow of other data through the system.

BRIEF SUMMARY OF THE INVENTION

A switching system, connectable to a communications network, is provided that is configured to handle logical multicast data without degrading the flow of other data through the system. The switching system includes a plurality of input ports, a plurality of output ports, and a plurality of queues configured to buffer data units being routed through the system. The plurality of queues is coupled between the input ports and the output ports to allow each output port to receive at least one buffered data unit from any input port for subsequent transmission at the output port. The plurality of queues is configured in at least one shared memory. In a preferred embodiment, at least one first shared memory includes at least one best effort queue, and at least one second shared memory includes at least one class queue for providing a predetermined Quality of Service level. The switching system further includes at least one meter such as a token bucket for metering data units provided to the class queue to ensure that the data units conform to the predetermined Quality of Service level, and at least one output port controller coupled between the shared memory and the plurality of output ports.

The output port controller is configured to direct at least one logical multicast data unit from a queue of the shared memory to one of the plurality of output ports, and replicate the data unit a predetermined number of times for subsequent logical multicasting on the output port. In a preferred embodiment, the output port controller comprises a logical multicast lookup table including a plurality of entries indicating numbers of times respective logical multicast data units are to be replicated. The lookup table is referenced by information contained in a header field of the logical multicast data unit.

The meter is configured to be charged once for each logical multicast data unit provided thereto. Moreover, each queue of the shared memory is configured to store a single representation of each logical multicast data unit. Each class queue is configured such that the queue length is charged for a number of data units corresponding to the number of times the logical multicast data unit is to be replicated by the output port controller.

Other features, functions, and aspects of the invention will be evident from the Detailed Description of the Invention that follows.

BRIEF DESCRIPTION OF THE SEVERAL VIEWS OF THE DRAWING

The invention will be more fully understood with reference to the following Detailed Description of the Invention in conjunction with the drawings of which.

DETAILED DESCRIPTION OF THE INVENTION

Systems and methods are disclosed for transferring logical multicast data between source nodes and destination nodes of a communications network by way of a switching system. The logical multicast data is routed through the switching system in a manner that does not degrade the flow of other data through the system.

Figure 1:
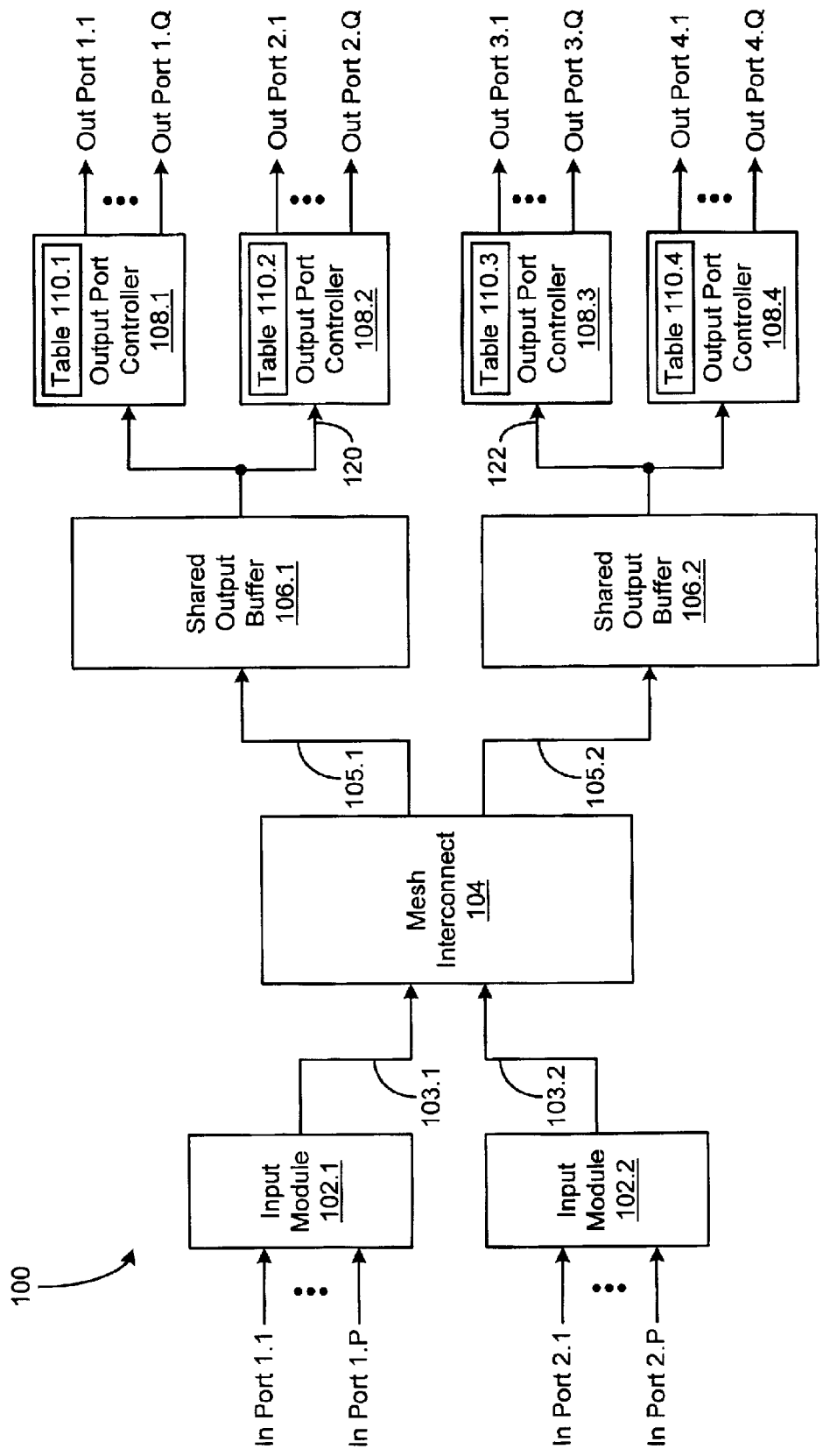
FIG. 1 is a block diagram depicting a first embodiment of a switching system in accordance with the present invention.

FIG. 1 depicts a block diagram of a switching system 100 configured to perform logical multicasting of data units such as data packets or frames on a communications network, in accordance with the present invention. The switching system 100 includes a plurality of input modules such as input modules 102.1–102.2. The input module 102.1 is configured to receive data units from a plurality of respective input ports 1.1–1.P coupled to the communications network, and the input module 102.2 is similarly configured to receive data units from a plurality of respective input ports 2.1–2.P coupled to the communications network. The input modules 102.1–102.2 provide the data units received from the respective input ports 1.1–1.P and 2.1–2.P to a mesh interconnect unit 104 by way of respective data buses 103.1–103.2. The bus 103.1 may therefore be shared by flows of data units received from the respective input ports 1.1–1.P, and the bus 103.2 may be similarly shared by flows of data units received from the respective input ports 2.1–2.P. For example, the data flows on the respective buses 103.1–103.2 may be destined for one or more output ports 1.1–1.Q, 2.1–2.Q, 3.1–3.Q, and 4.1–4.Q coupled to the communications network.

The mesh interconnect unit 104 is configured to determine the appropriate output port(s) for a particular data unit by accessing information contained in a header field of the data unit, and route the data unit through the switching system 100 based on results of the determination. In one embodiment, the output ports 1.1–1.Q, 2.1–2.Q, 3.1–3.Q, and 4.1–4.Q comprise respective connection lookup tables (not shown), which include connection information for transferring the data units to subsequent segments of the communications network coupled to the output ports 1.1–1.Q, 2.1–2.Q, 3.1–3.Q, and 4.1–4.Q. Each output port is configured to substitute appropriate connection information in the header field of the data unit to allow that data unit to be properly transferred to the next network segment.

The switching system 100 further includes a plurality of shared output buffers 106.1–106.2 configured to buffer flows of data units being routed through the system 100. The shared output buffers 106.1–106.2 receive such data flows from the mesh interconnect unit 104 by way of respective buses 105.1–105.2. The respective buses 105.1 and 105.2 may therefore be shared by more than one flow of data units received from the mesh interconnect unit 104. For example, the data flows on the bus 105.1 may be destined for one or more of the output ports 1.1–1.Q and 2.1–2.Q. Similarly, the data flows on the bus 105.2 may be destined for one or more of the output ports 3.1–3.Q and 4.1–4.Q.

The shared output buffers 106.1–106.2 comprise respective memories such as Random Access Memory (RAM). Further, in a preferred embodiment, each of the shared output buffers 106.1–106.2 is configured in a plurality of queues for receiving respective data flows. For example, each queue of the shared output buffers 106.1–106.2 may comprise a First-In First-Out (FIFO) buffer of suitable length.

Still further, the switching system 100 includes a plurality of output port controllers 108.1–108.4 coupled between the shared output buffers 108.1–108.2 and the output ports 1.1–1.Q, 2.1–2.Q, 3.1–3.Q, and 4.1–4.Q. Specifically, the output port controller 108.1 is coupled between the shared output buffer 106.1 and the output ports 1.1–1.Q, the output port controller 108.2 is coupled between the shared output buffer 106.1 and the output ports 2.1–2.Q, the output port controller 108.3 is coupled between the shared output buffer 106.2 and the output ports 3.1–3.Q, and the output port controller 108.4 is coupled between the shared output buffer 106.2 and the output ports 4.1–4.Q.

Each output port controller 108.1–108.4 is configured to receive at least one data unit from the respective shared output buffers 106.1–106.2, and direct the data unit to the appropriate output port(s) for subsequent unicasting or multicasting. The output port controllers 108.1–108.4 receive such data units from the respective shared output buffers 106.1–106.2 by way of buses 120 and 122. Specifically, the output port controllers 108.1–108.2 receive such data units from the shared output buffer 106.1 by way of the bus 120, and the output port controllers 108.3–108.4 receive such data units from the shared output buffer 106.2 by way of the bus 122. The respective buses 120 and 122 may therefore be shared by more than one flow of data units received from the shared output buffers 106.1–106.2. For example, the data flows on the bus 120 may be destined for one or more of the output ports 1.1–1.Q and 2.1–2.Q. Similarly, the data flows on the bus 122 may be destined for one or more of the output ports 3.1–3.Q and 4.1–4.Q.

In the event data units received by the output port controllers 108.1–108.4 comprise logical multicast data units, each output port controller 108.1–108.4 is further configured to replicate the data unit a predetermined number of times for subsequent logical multicasting on the appropriate output port. In a preferred embodiment, each output port controller 108.1–108.4 determines the number of times a particular logical multicast data unit is to be replicated by accessing information contained in a logical multicast lookup table. In the illustrated embodiment, the output port controller 108.1 includes a logical multicast lookup table 110.1, the output port controller 108.2 includes a logical multicast lookup table 110.2, the output port controller 108.3 includes a logical multicast lookup table 110.3, and the output port controller 108.4 includes a logical multicast lookup table 110.4. Each logical multicast lookup table 110.1–110.4 includes a plurality of entries indicating the number of times respective logical multicast data units are to be replicated. For example, the plurality of entries included in each table 110.1–110.4 may be referenced by identity information contained in header fields of respective logical multicast data units.

It is noted that the input module 102.1 or the input module 102.2 and the mesh interconnect unit 104 of the switching system 100 may be employed for spatially multicasting at least one data unit on the communications network. For example, the input module 102.1 may receive a single data unit from one of the input ports 1.1–1.P and provide that single data unit to the shared output buffer 106.1 by way of the mesh interconnect unit 104 and the bus 105.1. Next, the shared output buffer 106.1 may provide the single data unit to the output port controller 108.1, which may then direct single copies of the data unit to at least some of the respective output ports 1.1–1.Q for subsequent spatial multicasting on the network.

The manner in which the switching system 100 handles logical multicast data so as not to degrade the flow of other data through the system will be better understood with reference to the following first illustrative example. In this first example, it is understood that logical multicast data comprising at least one data unit enters the switching system 100 by way of an input port such as the input port 1.1. It is further understood that other data such as unicast and/or spatial multicast data comprising at least one data unit also enter the switching system 100 by way of at least some of the input ports 1.2–1.P. The logical multicast data and other data are then provided to respective queues included in the shared output buffer 106.1 by way of the input module 102.1, the bus 103.1, the mesh interconnect 104, and the bus 105.1. Accordingly, the buses 103.1 and 105.1 are shared by the logical multicast data and the other data being routed through the switching system 100 from the input ports 1.1–1.P to the shared output buffer 106.1.

Next, the logical multicast data and other data are provided to at least one of the output port controllers 108.1–108.2 by way of the bus 120. Like the buses 103.1 and 105.1, the bus 120 is shared by the logical multicast data and the other data being routed through the switching system 100 from the shared output buffer 106.1 to the output port controller 108.1.

In a conventional switching system, multiple copies of logical multicast data units are typically stored in a shared output buffer. As a result, a significant amount of bandwidth may be consumed as the multiple logical multicast data unit copies are routed from the shared output buffer to the appropriate output port, thereby potentially degrading the flow of other data being routed through the system.

In this first example, single representations of logical multicast data units are stored in the shared output buffer 106.1, and the logical multicast data units are replicated by the output port controller 108.1 for subsequent logical multicasting on the output port 1.1. It should be understood that the shared output buffer 106.2 is similarly configured to store single representations of logical multicast data like the shared output buffer 106.1, and each of the output port controllers 108.2–108.4 is similarly configured to replicate logical multicast data like the output port controller 108.1. As a result, the amount of bandwidth consumed on the shared bus 120 to support logical multicasting is limited, and any potential degrading of the flow of other data between the shared output buffer 108.1 and the output ports 1.2–1.Q is reduced.

As described above, the logical multicast lookup table 110.1 included in the output port controller 108.1 includes a plurality of entries indicating the number of times respective logical multicast data units are to be replicated by the output port controller 108.1. The logical multicast lookup table 110.1 therefore includes at least one entry corresponding to the logical multicast data unit provided to the output port controller 108.1 by the shared output buffer 108.1.

In this first example, the output port controller 108.1 accesses identity information contained in a header field of the logical multicast data unit, and uses the identity information to reference the entry included in the logical multicast lookup table 110.1 indicating the number of times to replicate the logical multicast data. The output port controller 108.1 then replicates the logical multicast data unit the appropriate number of times and provides the replicated data to the output port 1.1 for subsequent logical multicasting on the network. It is understood that the output port controller 108.1 also provides the other data to the respective output ports 1.2–1.Q for subsequent unicasting and/or spatial multicasting on the network.

Figure 2:
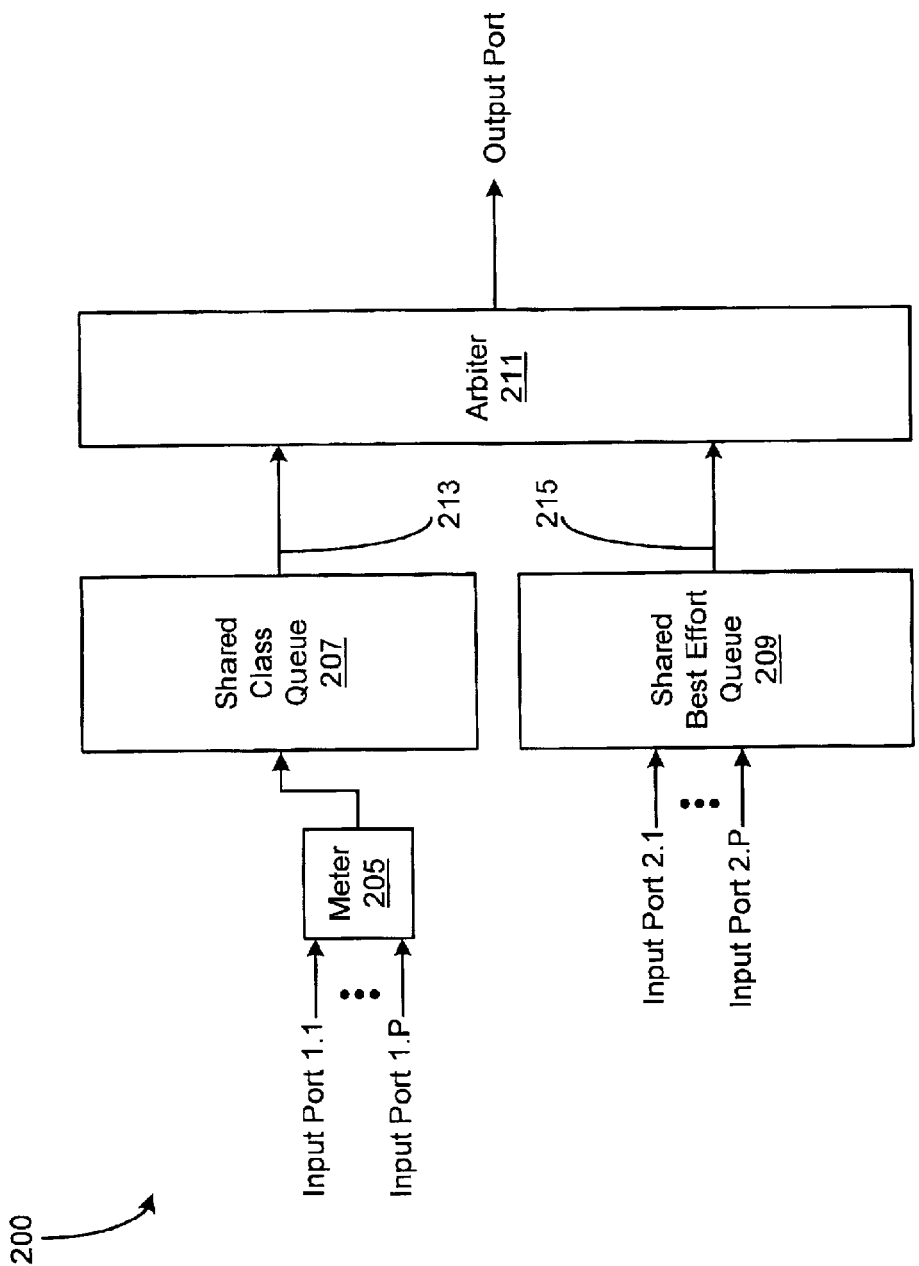
FIG. 2 is a block diagram depicting a second embodiment of a switching system in accordance with the present invention.

FIG. 2 depicts a block diagram of an alternative embodiment of a switching system 200 configured to perform logical multicasting on a communications network, in accordance with the present invention. It is noted that the switching system 200 is capable of providing guaranteed Quality of Service (QoS) levels for bandwidth and buffering. For example, the switching system 200 may provide constant bit-rate services that support real-time applications requiring fixed amounts of bandwidth. Accordingly, the switching system 200 includes a shared class queue 207 configured to buffer data flows for a predetermined QoS level.

Such switching systems capable of providing guaranteed QoS levels typically comprise a mechanism for policing data to ensure conformance with predetermined guaranteed bandwidths. In the illustrated embodiment, the switching system 200 includes at least one meter 205 configured to provide such policing of data entering the switching system 200. For example, the meter 205 may comprise a token bucket. Specifically, the meter 205 is coupled between the shared class queue 207 and a plurality of input ports 1.1–1.P. It is noted that the meter might alternatively be coupled at the output of the shared class queue 207.

It is understood that the switching system 200 may also provide unspecified bit-rate services (also known as "best effort" services) supporting non-real-time applications that do not require fixed bandwidths. Accordingly, the switching system 200 further includes a shared best effort queue 209 to buffer data flows provided by way of input ports 2.1–2.P for unspecified bit-rate service. For example, each of the shared class queue 207 and the shared best effort queue 209 may comprise a First-In First-Out (FIFO) buffer of suitable length.

Such switching systems capable of providing bandwidth guarantees typically comprise a mechanism for scheduling the output of data flows in a preferential manner. In the illustrated embodiment, the switching system 200 includes an arbiter 211 configured to control the preferential transmission of data units provided by the shared class queue 207 and the shared best effort queue 209. For example, the arbiter 211 may comprise an exhaustive priority arbiter. In one embodiment, the shared class queue 207 provides data flows for constant bit-rate service to the arbiter 211 by way of a bus 213, the shared best effort queue 209 provides data flows for unspecified bit-rate service to the arbiter 211 by way of a bus 215, and the arbiter 211 provides the data flows in a preferential manner to at least one output port for subsequent transmission on the communications network. In the illustrated embodiment, the arbiter 211 gives higher priority to data flows provided by the shared class queue 207 for transmission on the network, and allows any excess bandwidth available at the output port to be used for transmitting data flows provided by the shared best effort queue 209.

As described above, not only is the switching system 200 capable of providing bandwidth guarantees, but it is also capable of providing buffer guarantees. For example, the switching system 200 may be configured to provide a fixed buffer allocation, in which the shared class queue 207 and the shared best effort queue 209 are allocated specified numbers of locations for storing data units. In the event the bandwidth at the input port 2.1 exceeds the egress bandwidth for the shared best effort queue 209, the shared best effort queue 209 overflows and data units are dropped. In the event the bandwidth at the input port 1.1 exceeds the egress bandwidth for the shared class queue 207, the meter 205 does not provide the high bandwidth data flow to the shared class queue 207. Accordingly, only data flows that conform to the egress bandwidth of the shared class queue 207 are provided to the shared class queue 207, and no data units provided to the shared class queue 207 are dropped.

Those of ordinary skill in the art will appreciate that various techniques for providing differentiated services on switching systems are known. One such technique is described in RFC 2697, A Single Rate Three Color Marker, J. Heinanen, R. Guerin, September 1999, which is incorporated herein by reference. According to that technique, meters such as the meter 205 do not merely make a "go" or "no-go" decision with respect to a metered data flow, but instead mark the metered flow "green" as conforming to a Committed Information Rate (CIR), "yellow" as exceeding the CIR while conforming to a Peak Information Rate (PIR), or "red" as exceeding the PIR. It is further appreciated that a class queue may be configured to have a number of associated fill thresholds. For example, in the event the number of data units stored in the class queue is below a first fill threshold, data flows marked with any color are admitted into the queue. In the event the number of data units in the class queue is greater than the first threshold but less than a second fill threshold, data flows marked red are no longer admitted into the queue. In the event the number of data units in the class queue is greater than the second threshold but less than a third fill threshold, data flows marked red and yellow are no longer admitted into the queue. In the event the number of data units in the class queue equals the third threshold, no more data units are admitted into the queue. According to this technique, data flows marked green get preference in being admitted into the class queue.

The manner in which the switching system 200 handles logical multicast data so as not to degrade the flow of other data through the system will be better understood with reference to the following second illustrative example. In this second example, it is understood that logical multicast data comprising at least one data unit enters the switching system 200 by way of the input port 1.1, and other data such as unicast and/or spatial multicast data comprising at least one data unit also enters the switching system 200 by way of at least some of the input ports 1.2–1.P. The logical multicast data and other data are then provided to the meter 205.

The meter 205 is configured to be charged once for each logical multicast data unit provided thereto; i.e., the meter 205 makes a single determination for each logical multicast data unit as to whether the data unit conforms to a predetermined guaranteed bandwidth. Similarly, the meter 205 is configured to be charged once for each unicast and/or spatial multicast data unit provided thereto. Because the meter 205 is not charged for the total number of times, N, the logical multicast data unit is to be replicated for subsequent logical multicasting on the network, any potential degrading of the flow of the other data through the switching system 200 by way of the meter 205 is reduced. The logical multicast data and other data are then provided to the shared class queue 207.

The shared class queue 207 is configured to store a single representation of each metered unicast, spatial multicast, and/or logical multicast data unit provided thereto. Because each metered data unit provided to the shared class queue 207 is stored only once, whether or not the data unit comprises logical multicast data, the efficiency of utilization of the shared class queue 207 is increased. Further, the shared class queue 207 is configured such that the queue length is charged once for each unicast and/or spatial multicast data unit provided thereto; and, charged N times for each logical multicast data unit provided thereto, in which "N" corresponds to the number of times the logical multicast data unit is to be replicated for subsequent logical multicasting. For example, when charging the queue length of the shared class queue N times for each logical multicast data unit, the shared class queue 207 is considered to be storing N representations of the logical multicast data unit, even though it may actually be storing only a single representation of the data unit.

Charging the queue length of the shared class queue 207 for N logical multicast data units makes the shared class queue 207 suitable for use with services that employ the above-described three color marking technique and multiple fill thresholds. Specifically, when determining whether particular fill thresholds of the shared class queue 207 have been reached or exceeded, consideration is made of the number of times the queue length of the shared class queue 207 has been charged for the data units stored therein. Charging the queue length N times for logical multicast data results in more efficient preferential queuing of data flows marked green than charging the queue length only once for the logical multicast data.

Figure 3:
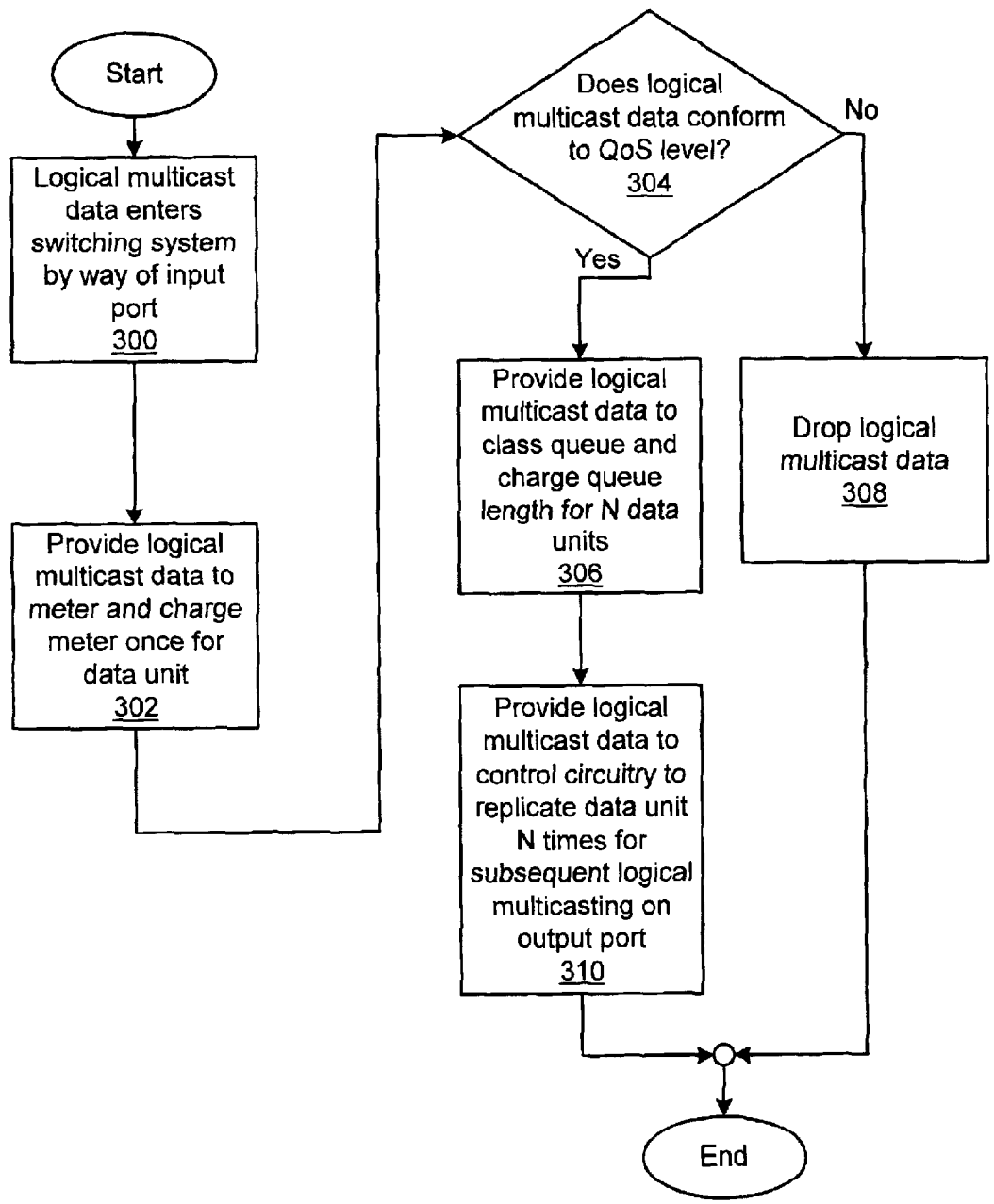
FIG. 3 is a flow diagram depicting a method of routing data units through the switching systems of FIGS. 1 and 2.

The presently disclosed method of routing logical multicast data through the switching systems of FIGS. 1 and 2 is illustrated by reference to FIG. 3. It should be understood that the method steps depicted in FIG. 3 are merely exemplary, and that alternate method steps may be used to route the logical multicast data without degrading the flow of other data through the switching systems 100 and 200. As depicted in step 300, at least one logical multicast data unit enters the switching system by way of an input port. Next, the logical multicast data unit is provided, as depicted in step 302, to a meter included in the switching system such that the meter is charged once for the logical multicast data unit. A determination is then made, as depicted in step 304, as to whether the metered data conforms to a predetermined QoS level. In the event it is determined that the logical multicast data unit conforms to the predetermined QoS level, the logical multicast data unit is provided, as depicted in step 306, to a class queue such that only a single representation of the data unit is stored, but the queue length is charged for N logical multicast data units, in which "N" corresponds to the number of times the data unit is to be replicated for subsequent logical multicasting. In the event it is determined that the logical multicast data unit does not conform to the predetermined QoS level, the nonconforming logical multicast data unit is dropped, as depicted in step 308. Next, the logical multicast data unit is provided, as depicted in step 310, to control circuitry, in which the logical multicast data unit is replicated N times for subsequent logical multicasting on the network by way of an output port.

Although FIG. 1 depicts the switching system 100 as including two (2) output buffers and four (4) output port controllers, and FIG. 2 depicts the switching system 200 as including one (1) meter and two (2) queues, it is understood that the switching systems 100 and 200 may include any suitable numbers of input ports, output ports, buffers, controllers, meters, and/or queues.

It will further be appreciated by those of ordinary skill in the art that modifications to and variations of the above-described switching systems may be made without departing from the inventive concepts disclosed herein. Accordingly, the invention should not be viewed as limited except as by the scope and spirit of the appended claims.

What is claimed is:

1. A switching system connectable to a communications network, and operable to transfer logical multicast data units between a plurality of nodes on the communications network, comprising:
   at least one input port connectable to the communications network, the at least one input port being operative to receive a data unit from the network;
   at least one output port connectable to the communications network, the at least one output port being operative to transmit plurality of data units onto the network as logical multicast data units; and
   at least one output port controller coupled between the at least one input port and the at least one output port,
   wherein the output port controller is operative to replicate the received data unit a predetermined number of times within the output port controller for subsequent transmission of the predetermined number of replicated data units onto the communications network at a respective output port as logical multicast data units.

2. The switching system of claim 1 wherein the output port controller includes a lookup table comprising a plurality of entries and the output port controller is further operative to determine the predetermined number of times to replicate the received logical multicast data unit by referencing at least one entry in the lookup table.

3. The switching system of claim 2 wherein the output port controller is further operative to access identity information contained in a header field of the received logical multicast data unit and use the identity information to reference the entry in the lookup table.

4. The switching system of claim 1 further including a buffer memory coupled between the input port and the output port controller, the buffer memory being operative to store a single representation of the received logical multicast data unit.

5. The switching system of claim 4 further including a bus interconnecting the buffer memory and the output port controller, the buffer memory being further operative to provide the single representation of the received logical multicast data unit to the output port controller by way of the bus.

6. A switching system connectable to a communications network, and operable to transfer logical multicast data units between a plurality of nodes on the communications network, comprising:
   at least one input port connectable to the communications network, the at least one input port being operative to receive a data unit from the network;
   at least one output port connectable to the communications network, the at least one output port being operative to transmit the data unit a predetermined number of times onto the network as logical multicast data units; and
   at least one meter coupled between the at least one input port and the at least one output port,
   wherein the at least one meter is operative to determine whether the predetermined number of transmitted logical multicast data units conform to predetermined quality of service criteria by an analysis of the received data unit.

7. The switching system of claim 6 further including at least one buffer memory operative to store a single representation of the received logical multicast data unit and provide the single data unit representation to the output port for subsequent transmission onto the network.

8. The switching system of claim 7 wherein the buffer memory comprises at least one class queue.

9. The switching system of claim 7 wherein the meter is coupled between the input port and the buffer memory.

10. The switching system of claim 7 wherein the meter is coupled between the buffer memory and the output port.

11. The switching system of claim 6 wherein the meter comprises a token bucket.

12. A switching system connectable to a communications network, and operable to transfer logical multicast data units between a plurality of nodes on the communications network, comprising: at least one input port connectable to the communications network, the at least one input port being operative to receive a plurality of data units from the network;
   at least one output port connectable to the communications network, the at least one output port being operative to transmit each data unit a respective predetermined number of times onto the network as logical multicast data units; and
   at least one buffer memory operative to store a single representation of each data unit and provide the respective data unit representations to a respective output port for subsequent transmission onto the network as logical multicast data units,
   wherein the buffer memory is further operative to store the respective data unit representations in a preferential manner based at least in part on the respective predetermined number of times the data units are subsequently transmitted onto the network at the respective output port as logical multicast data units.

13. The switching system of claim 12 wherein the buffer memory comprises at least one class queue.

14. The switching system of claim 13 wherein the class queue comprises a first-in first-out memory.

15. A method of operating a switching system connectable to a communications network, the switching system being operable to transfer logical multicast data units between a plurality of nodes on the communications network, the method comprising the steps of:
   receiving a data unit at an input module of the switching system;
   providing the received data unit to a respective output module of the switching system;
   replicating the received data unit a predetermined number of times within respective output module; and
   transmitting the replicated data units onto the communications network as logical multicast data units by the respective output module.

16. The method of claim 15 further including the step of referencing at least one entry in a lookup table included in the respective output module to determine the predetermined number of times to replicate the data unit.

17. A method of operating a switching system connectable to a communications network, the switching system being operable to transfer logical multicast data units between a plurality of nodes on the communications network, the method comprising the steps of:

receiving a single data unit at an input port of the switching system;

analyzing the single data unit at a meter of the switching system to determine whether the data unit conforms to predetermined quality of service criteria; and in the event the data unit conforms to the predetermined quality of service criteria, transmitting the single data unit onto the communications network a predetermined number of times at a respective output port of the switching system as logical multicast data units.

18. A method of operating a switching system connectable to a communications network, the switching system being operable to transfer logical multicast data units between a plurality of nodes on the communications network, comprising the steps of:

receiving a plurality of data units at at least one input port of the switching system;

storing the plurality of data units in a preferential manner in a buffer memory of the switching system based at least in part on respective predetermined numbers of times the data units are subsequently transmitted onto the communications network as logical multicast data units; and transmitting the plurality of data units onto the communications network at a respective output port of the switching system as logical multicast data units in accordance with the preferential manner in which the data units are stored in the buffer memory.

* * * * *